H. J. DEW.
LAMP FOR MOTOR VEHICLES AND LIKE SERVICES.
APPLICATION FILED MAR. 15, 1916.

1,221,036.

Patented Apr. 3, 1917.

Inventor:
Henry J. Dew,
by
Attys.

UNITED STATES PATENT OFFICE.

HENRY JOSEPH DEW, OF CHORLTON-CUM-HARDY, MANCHESTER, ENGLAND.

LAMP FOR MOTOR-VEHICLES AND LIKE SERVICES.

1,221,036.   Specification of Letters Patent.   Patented Apr. 3, 1917.

Application filed March 15, 1916. Serial No. 84,380.

*To all whom it may concern:*

Be it known that I, HENRY JOSEPH DEW, a subject of the King of Great Britain and Ireland, and resident of 51 High Lane, Chorlton-cum-Hardy, Manchester, in the county of Lancaster, England, have invented certain new and useful Improvements in Lamps for Motor-Vehicles and like Services, of which the following is a specification.

This invention relates to lamps and more particularly to the incandescent gas and like lamps employed upon motor and like vehicles, its object being to provide improved means for securing the reflecting lens or mirror in place so that the same may be readily removed and replaced in its correct position or a new mirror inserted without the necessity for the employment of special tools or skilled labor.

My invention comprises the combination with the reflecting lens or mirror, of a detachable securing and positioning ring whereby the lens is held in place in the lamp and correctly positioned with relation to the burner or source of light for reflecting purposes.

Referring to the accompanying sheet of explanatory drawings:—

Figure 1:
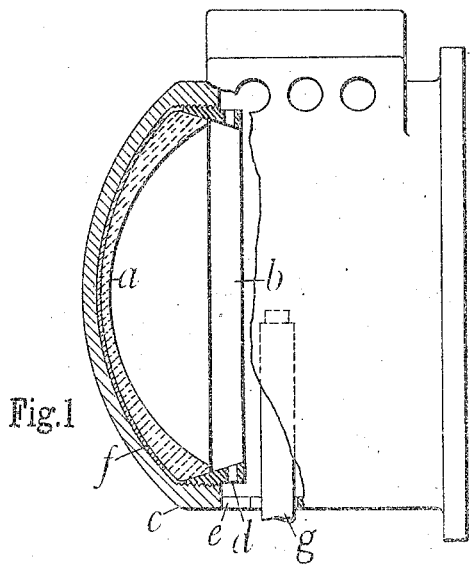
Figure 2:
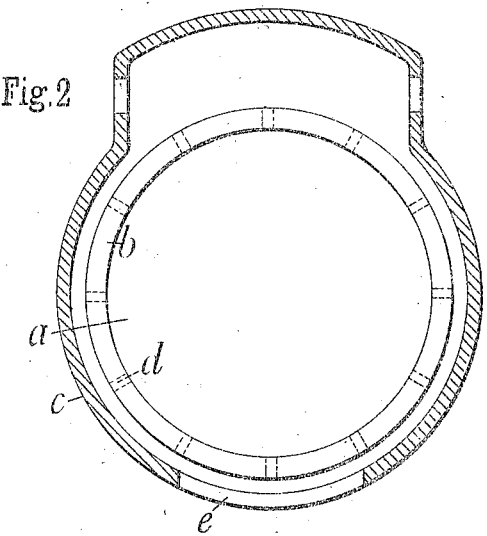

Figure 1 is a side elevation with the lens securing means in section and Fig. 2 a sectional front elevation, of a lamp having the lens securing means constructed in accordance with my invention.

The same reference letters in the two views indicate the same parts.

In the illustrated application of my invention, the interior of the back of the lamp is suitably shaped to receive an unmounted lens or mirror $a$ which is held in place by a ring like member $b$ screwing into the lamp body $c$ around the lens. The interengaging faces of lens and ring are preferably tapered so that the act of screwing the ring into place also insures that the lens shall be correctly positioned for ray reflecting purposes. The securing ring has one portion of its periphery threaded and the other portion plain but provided with tommy holes $d$ to receive the end of a tommy bar inserted through an elongated slot $e$ in the lamp for the purpose of screwing the ring home. An asbestos or other packing piece $f$ may be placed between the lens and the back of the lamp. The burner is indicated by $g$.

With the arrangement aforesaid, should the lens be fractured or otherwise damaged, it is only necessary to unscrew the securing ring, when the lens can be removed and a new one inserted. Considerable economy in lamp maintenance is thereby effected. If desired the lens may be mounted in a metal carrier, but the latter, which serves as a protecting cover only, is not necessary.

Having now described my invention, what I claim as new and desire to secure by Letters Patent is:—

1. In lamps for motor vehicles and like services, in combination, a reflecting lens or mirror having a tapered peripheral edge, a ring internally coned for positioning the lens and externally threaded for screwing into the lamp, tommy holes in said ring, and an elongated slot in the lamp body for providing access to said tommy holes, as set forth.

2. In lamps for motor vehicles and like services, in combination, an unmounted reflecting lens or mirror having a tapered peripheral edge, a recess in the interior of the back of the lamp shaped to receive said lens, packing material between said lens and lamp, a ring coned for positioning said lens and threaded for screwing into the lamp, tommy holes in an unthreaded part of said ring, and an elongated slot in the lamp body providing access to said tommy holes, as set forth.

In testimony whereof I have signed my name to this specification in the presence of two subscribing witnesses.

HENRY JOSEPH DEW.

Witnesses:
ARTHUR HUGHES,
HILDA HUGHES.